United States Patent Office 3,218,153
Patented Nov. 16, 1965

3,218,153
METHOD OF PRODUCING MOLDED BODIES FOR USE IN ELECTRIC SMELTING FURNACES
Anders Schei and Ove Helgesson Sandberg, Kristiansand, Norway, assignors to Elektrokemisk A/S, Radhusgaten, Oslo, Norway, a corporation of Norway
No Drawing. Filed July 18, 1962, Ser. No. 210,841
Claims priority, application Norway, Aug. 14, 1961, 141,165
6 Claims. (Cl. 75—3)

It is known that certain advantages are obtained in operating electric smelting furnaces for the reduction of metal oxides by charging the furnace with pellets or briquettes consisting of molded bodies of finely divided metal oxide ore homogeneously mixed with that amount of carbonaceous material required for reduction of the metal oxide. These molded bodies tend to expedite the stoking and charging of the furnace and they assist in providing well balanced operating conditions which in some cases are only obtained with difficulty when the metal oxide ore and carbon are separately fed in lump form.

One drawback to the use of pellets and briquettes is that the yield of metal tends to be somewhat low. In working with this problem it has now been discovered that it is possible to materially increase the yield by molding the pellets or briquettes in such manner as to provide a core which contains an excess of metal oxide surrounded by a second layer or shell which contains an excess of carbonaceous reducing agent. For best results all of the metal oxide is located in the core and all of the carbonaceous reducing agent is located in the shell.

It is known that the reduction of certain metal oxides is completely or partially carried out through the production of volatile suboxides and solid or liquid oxycarbides or metal carbides. For example, the reduction of $SiO_2$ to metallic Si by means of carbon involves the following reactions (1) $SiO_2 + C \rightarrow SiO + CO$
(2) $SiO + 2C \rightarrow SiC + CO$
(3) $2SiO_2 + SiC \rightarrow 3SiO + CO$
(4) $SiO + SiC \rightarrow 2Si + CO$ Another example is the reduction of $Al_2O_3$ by means of carbon in which case the intermediate compounds of $Al_2O$, $Al_4C_3$ and $Al_4O_4C$ are formed.

The volatile suboxides are cooled as they move upwardly in the furnace and when cool the suboxides decompose into metal and normal oxides or they react with CO to form the normal oxide, oxycarbides or metal carbide. In both cases the resulting compounds will be present in very finely divided form, and in the usual smelting furnace the finely divided particles are readily carried out of the furnace by rising furnace gases. Some of the volatile suboxides will also leave the furnace in unreacted state.

In an electric smelting furnace the temperature usually decreases in the direction of gas flow, and it is therefore important that the suboxides which are carried along with the gas do not leave the furnace in an unreacted state but are caused to react with carbon to form metal carbide before the volatile oxide is so much cooled as to decompose into metal and normal oxide or react with CO to form the normal oxide, oxycarbide or metal carbide. The metal carbide which is formed by reaction with carbon is usually found deposited on the surface of coke grains so that it is not so readily removed from the furnace by the rising gas.

In certain cases the reduction temperature is so high that metal vapor will rise in the furnace along with the gas. The metal vapor may be carried out of the furnace or it may react with CO in the colder parts of the furnace and form carbide and metal oxide which are so finely divided that they are readily carried from the furnace by the rising gas. The highest yield of metal is obtained when the metal vapors are made to react with carbon in a zone where the temperature is so high that reaction with CO is insignificant and may be disregarded.

It is known that reactions (2) and (4) set forth hereinabove tend to prevent loss of suboxides and that these reactions proceed more rapidly when the raw materials are in a finely divided form and homogeneously and intimately mixed as in pellets or briquettes. A high yield of metal should therefore result by using a charge consisting of molded bodies in which the desired proportions of metal oxide and carbonaceous reducing agent are present in finely divided state and in intimate contact. Nevertheless in our work the yield of metal was low when molded bodies made in conventional manner were fed to the furnace.

The applicants have carried out a series of pilot plant runs using a conventional 40 KW monophase electric smelting furnace operated in conventional manner to produce high grade silicon metal. In the tests conventional proportions of silicon dioxide ore and coke were employed in the furnace to provide about 2 moles of carbon for each mole of $SiO_2$.

When lumpy quartz and coke were smelted, the furnace operation was very uneven, as was expected, and the furnace required intensive stoking and careful charging. The yield of metal was good as compared to that obtained in ordinary commercial operations.

When the raw materials were grounded and homogeneously mixed and molded into pellets in conventional manner, the operation of the furnace was very smooth and gas distribution and flow through the charge was good. Stoking of the charge was necessary to cause it to move downwardly into the hottest zone of the furnace. The yield of metal was low. The furnace was excavated and the hottest zone of the furnace was found to be substantially filled with silicon carbide.

While applicants do not now know the exact reason for the low yield of metal it may be due to the fact that SiO was formed at such a low temperature that the metal forming reaction (4) could not take place. Also the formation of suboxides according to reaction (1) may have proceeded so rapidly that the suboxides tended to escape from the furnace without further reaction. It is also possible that because of intimate contact between metal oxide and reducing agent within the molded bodies, all of the reducing agent was used up in the middle zone of the furnace to form the carbides according to reaction (2) and there was no free carbon available to reduce the suboxide present in this zone. But regardless of whatever mechanism of reaction may later be proven to be true, the fact remains that the yield was low as compared to that obtained with the lumpy charge.

When the ground raw materials were molded into pellets consisting of a core containing an excess of $SiO_2$ in the proportion of about 7 moles of quartz and about 6 moles of carbon surrounded by a shell consisting of about 8 moles of carbon, the furnace operation was very smooth. Gas distribution was good and the charge sunk down in the furnace without stoking. The yield of metal was good.

Excavation of the furnace showed that the metal was concentrated in the hottest zone of the furnace. The metal did contain some carbide and in the extremities of the hottest zone there were found the remains of pellet shells essentially in the form of a lattice of carbide. Nearer the furnace wall the shells were wholly or partly transformed to carbide and parts of the core were still present in unreacted state.

It is believed that the increased yield over that obtained with the ordinary type of pellets is due to the fact that suboxides which are formed in the core of the pellets made in accordance with the present invention will first react with the carbon in the shell to form metal carbide which in turn will further react with oxide and suboxides in the core to form metal (reactions 3 and 4). Those amounts of suboxide which must necessarily leave the hottest zone of the furnace during operation will react with carbon in the exterior shell of pellets located in the cooler parts of the furnace to form carbide. As a result the loss of suboxides is reduced and production of metal approaches an optimum value.

In other runs the entire core of the pellets consisted of quartz surrounded by a shell of coke. As in the above runs the proportions were conventional and two moles of carbon were used for each mole of quartz in the charge. The furnace operation, distribution of gas, and sinking of the charge was even better than that experienced when the core contained carbon with an excess of quartz. Excavation of the furnace showed that the metal had sunk to the bottom of the furnace and the metal was almost free of carbide.

The molded aggregates of the present invention are formed in conventional equipment using conventional materials in conventional proportions.

As is conventional in the art the metal oxide and carbonaceous reducing agent are preferably ground fine enough so that about fifty percent will pass through a 200 mesh Tyler screen and the remainder preferably passes through a 30 mesh Tyler screen. However, if desired the ore such as quartz may be course ground to provide grains of about 5 to about 15 mm. diameter. In such case finely ground coke is pelletized on the outside of each quartz grain. The size of the pellets will in general be about 10 to 25 mm. in diameter.

Conventional binders such as Portland or alumina cement, molasses, bentonite and sulphite lye may be employed in conventional amount of about 1 to 8% by weight of the mix. The usual fluxes may be incorporated into the pellets and about 7 to 13 percent of water by weight of the mix is ordinarily employed to assist in forming the aggregates.

Conventional carbonaceous reducing agents are used in the pellets such as coke, coal, peat, etc., and the amount of reducing agent in the charge is enough to provide a slight excess of carbon over the stoichiometric amount required for the reduction of metal oxide in the ore. It is not essential that each pellet have exactly the amount of carbon required for reduction of the metal oxide in each individual pellet. Some pellets will have more carbon and some will have less but on the average there will be a slight excess of carbon over the amount required for reduction of metal oxide in the charge in the furnace.

It is an important feature of the present invention that the pellets are formed with two layers and that the inside layer or core have an excess of metal oxide over the stoichiometric amount which can be reduced by the carbon in the core and that the outer layer or shell have an excess of carbon over the stoichiometric amount required for reduction of the metal oxide in the shell. The excess referred to of course includes the slight excess of reducing agent conventionally used in the charge to an electric smelting furnace.

The pellets of the present invention may be used in any of the electric furnaces ordinarily employed for reduction of metal oxide ores such as the one described in United States Letters Patent No. 2,794,843. The pellets of the present invention are especially useful for improving furnace operation and increasing yield in many of the more difficult smelting operations such as employed in the production of high grade FeSi, silicon metal, silico-aluminum, silicon and aluminum containing ferro alloys etc. In the production of metal alloys, it is only necessary to add the alloying metal to the core or to the shell of the pellet whichever is most convenient. For example in the production of ferro silicon, finely ground metallic iron in conventional proportion is mixed into the finely ground silica ore. As is known the amount of iron added to the charge will be determined by the amount of iron in the selected silica ore.

*Example I*

In a typical operation a high grade silica ore is crushed and ground until at least 50 percent of the ore passes through a 200 mesh Tyler screen and the remainder through a 30 mesh screen. A commercial grade of carbonaceous reducing materials, consisting of a mixture of 50% coke and 50% coal, is separately crushed and ground to the same degree of fineness as the ore. The silica ore and reducing materials are mixed in an ordinary cement mixer together with a high grade concentrate of iron ore and in the presence of sulphite lye in the amount of 1.5 percent binder on a dry weight basis. The proportion of silica ore and coke in the mix is adjusted to provide about 7 moles of silicon dioxide for each 6 moles of carbon. The proportion of silica ore and iron ore in the mix is adjusted to provide about 90% silicon in the finished alloy. A second mix is produced containing only coke and coal in the same proportion as in the first mix and in the presence of sulphite lye in the amount of 1.5 percent binder on a dry weight basis.

The first mix is fed into a conventional type of disc pelletizer to form pelletized cores containing an excess of $SiO_2$ over the amount which can be reduced by the carbon present in the core. Water is added during this operation in an amount necessary to provide good pelletizing conditions. The core pellets are transferred to a second disc pelletizer, and the second mix, containing only reducing agents and binder, is rolled on the cores to give a coating or shell of reducing material. The proportion of core pellets to the mixture of reducing materials fed into the second disc pelletizer is regulated to give 8 moles of carbon in the coating for each 6 moles of silicon dioxide in the core. Water is added during the pelletizing in an amount necessary to give good pelletizing conditions. Examination of the finished pellets will show that the reducing materials have completely encapsulated the core. When the finished pellets have dried, they are fed into an electric smelting furnace. In this example stoichiometric amounts of $SiO_2$ and carbon were employed for test purposes but it will be understood that a slight excess of carbon is ordinarily employed for commercial operations. In some cases it may be desirable for commercial operations to feed a portion of the carbon into the furnace in a separate step. The pellets of the present invention may be employed in such a process provided the above specified relationship of ore and carbonaceous reducing agent is maintained in the core and shell of the pellets.

It will be understood that it is intended to cover all changes and modifications of the preferred form of structure herein chosen for the purpose of illustration which do not constitute a departure from the spirit and scope of the invention as defined by the appended claims.

What we claim is:

1. In the production of metals and metal alloys from metal oxides which are wholly or partly reduced in an electric furnace into metal sub-oxides which are volatile at the temperatures of reduction and tend to escape from the furnace, said metal oxide including at least one oxide selected from the group consisting of silicon and aluminum oxides, the improvement which comprises forming pellets which have a core containing said metal oxide and a shell containing a solid carbonaceous reducing agent, the proportion of metal oxide in said core being in excess of the amount which can be reduced by any carbonaceous reducing agent which is contained in said core, and the proportion of carbonaceous reducing agent contained in the shell surrounding said core being in excess of the amount required for reduction of any metal oxide contained in said shell, and then heating said pellets to temperatures at which reduction of said metal oxide takes place, whereby loss of metal oxide from escape of the volatile metal sub-oxides is minimized.

2. The improvement as in claim 1 wherein the core of said pellets contains solely metal oxide and wherein the shell surrounding said core contains solely carbonaceous reducing agent.

3. The improvement as in claim 1 wherein the core of said pellets contains solely metal oxide and wherein the shell surrounding said core contains a mixture of metal oxide and carbonaceous reducing agent but the amount of carbonaceous reducing agent is in excess of the amount required to reduce all of said second-mentioned metal oxide.

4. The improvement as in claim 1 wherein the core of said pellets contains a mixture of metal oxide and carbonaceous reducing agent but the amount of carbonaceous reducing agent is insufficient to reduce all of said metal oxide and wherein the shell surrounding said core contains solely carbonaceous reducing agent.

5. The improvement as in claim 1 wherein the core of said pellets contains a mixture of metal oxide and carbonaceous reducing agent, but the amount of carbonaceous reducing agent is insufficient to reduce all of said metal oxide, and wherein the shell surrounding said core also contains a mixture of metal oxide and carbonaceous reducing agent, but the amount of carbonaceous reducing agent is in excess of the amount required to reduce said second-mentioned metal oxide.

6. The improvement as in claim 1 wherein the core of said pellets contains a mixture of silicon dioxide and carbonaceous reducing agent in the proportions of 7 mols of silicon dioxide for each 6 mols of carbonaceous reducing agent and wherein the shell surrounding said core contains 8 mols of carbonaceous reducing agent for each 6 mols of silicon dioxide contained in said core.

References Cited by the Examiner
UNITED STATES PATENTS

| | | | |
|---|---|---|---|
| 2,082,359 | 6/1937 | Schumacher | 75—44 |
| 2,127,632 | 8/1938 | Najarian | 75—3 |
| 2,792,298 | 5/1957 | Freeman | 75—33 |
| 2,805,141 | 9/1957 | Apuli | 75—3 |
| 2,806,779 | 9/1957 | Case | 75—33 |
| 2,864,687 | 12/1958 | Myron | 75—3 |
| 3,036,910 | 5/1962 | Eichenberger | 75—44 |

BENJAMIN HENKIN, *Primary Examiner.*

DAVID L. RECK, *Examiner.*